(12) United States Patent
Hayashi et al.

(10) Patent No.: US 6,321,094 B1
(45) Date of Patent: Nov. 20, 2001

(54) ACCESS METHOD THROUGH RADIO MOBILE COMMUNICATION SYSTEM

(75) Inventors: Keiichi Hayashi; Hiroto Nagai, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/015,909

(22) Filed: Jan. 30, 1998

(30) Foreign Application Priority Data

Jan. 31, 1997 (JP) .................................................. 9-017989

(51) Int. Cl.⁷ .............................. H04Q 7/20; H04Q 7/38
(52) U.S. Cl. .................... 455/517; 455/403; 455/410; 455/411; 455/500; 455/550; 455/560; 379/161; 379/168; 379/169; 379/184; 379/194
(58) Field of Search .................................. 455/517, 403, 455/410, 411, 422, 432, 434, 435, 515, 500, 59, 412, 414, 418, 419, 550, 552, 560; 379/161, 168, 169, 184, 194; 380/44, 45, 26, 47, 11, 6, 48, 49, 50, 52

(56) References Cited

U.S. PATENT DOCUMENTS

| | | | |
|---|---|---|---|
| 4,549,308 | * 10/1985 | Lopinto | 455/410 |
| 4,771,462 | * 9/1988 | Hannan et al. | 380/44 |
| 5,325,419 | * 6/1994 | Connolly et al. | 455/411 |
| 5,689,563 | * 11/1997 | Brown et al. | 455/411 |
| 5,889,861 | * 3/1999 | Ohashi et al. | 455/411 |

FOREIGN PATENT DOCUMENTS

| | | |
|---|---|---|
| 4-23527 | 1/1992 | (JP) . |
| 4023527 A2 | 1/1992 | (JP) . |
| 4046493 A2 | 2/1992 | (JP) . |
| 423341 A2 | 8/1992 | (JP) . |
| 5183507 A2 | 7/1993 | (JP) . |
| 5268156 A2 | 10/1993 | (JP) . |
| 6350522 A2 | 12/1994 | (JP) . |
| 7170576 A2 | 7/1995 | (JP) . |
| 7177571 A2 | 7/1995 | (JP) . |
| 8098247 A2 | 4/1996 | (JP) . |
| 8307943 A2 | 11/1996 | (JP) . |
| 8331643 A2 | 12/1996 | (JP) . |
| WO 97/08906 | 3/1997 | (WO) . |
| WO 98/11487 | 3/1998 | (WO) . |

OTHER PUBLICATIONS

English translation of Japanese Office Action dated Apr. 6, 1999 (Hei II).

* cited by examiner

*Primary Examiner*—William Trost
*Assistant Examiner*—Keith Ferguson
(74) *Attorney, Agent, or Firm*—McGuireWoods LLP

(57) ABSTRACT

In a network system including a wireless mobile communications system, when establishing a connection between a wireless mobile terminal and a host computer connected to a stationary network system, the wireless mobile terminal produces a connection establishment request signal including first information which is required to obtain services from the host computer and then transmits the connection establishment request signal to the host computer. The host computer verifies the first information included in the connection establishment request signal received from the wireless mobile terminal and transmits a response signal back to the wireless mobile terminal only when the first information has been verified. This causes the connection to be established between the wireless mobile terminal and the host computer.

6 Claims, 7 Drawing Sheets

ACCESS METHOD THROUGH RADIO MOBILE COMMUNICATION SYSTEM

BACKGROUND OF THE INVENTION

1. Field of the Invention

The present invention generally relates to a network system including a mobile communications system, and in particular to an access method which provides a mobile terminal with access to a host computer of the mobile terminal through the mobile communications system.

2. Description of the Related Art

In radio mobile communications, a plurality of data exchanges are needed for connection establishment between a mobile terminal and a connection control station. To achieve rapid connection establishment, there has been proposed a call connection procedure in Japanese Patent Unexamined Publication No. 4-23527. More specifically, when calling, the mobile terminal transmits a calling signal conveying a source ID (identification) number, a destination ID number, and additional information to the connection control station. In the connection control, the following processes are performed concurrently: a subscriber information check using the source ID number, an additional information check, and a connection process of a switching system. Only when all responses to the checks and the connection process are affirmative, the connection between the mobile terminal and the connection control station is established.

An authentication method using secret-key encryption has been proposed in Japanese Patent Unexamined Publication No. 5-183507. An ID center transmits random data as an authentication request signal to a mobile terminal. At the mobile terminal, the received random data and a secret key input by the subscriber are used to produced encrypted data. The encrypted data is transmitted as an authentication response signal to the ID center. At the ID center, the random data and a registered secret key are used to produce encrypted data which is compared with the received encrypted data from the mobile terminal. If the produced encrypted data is coincident with the received one, the authentication check is affirmative.

Similarly, a radio telephone service access method using secret-key encryption has been proposed in Japanese Patent Unexamined Publication No. 4-2333341.

In the case of a host access system in which a mobile terminal obtains access to a host computer through the mobile communication system, however, the conventional technique described above fails to provide both sufficiently rapid connection establishment and sufficient security of private information. In the connection control procedure where a calling signal conveying a source ID number, a destination ID number and additional information is transmitted to the connection control station, after all the necessary check processes have been completed in the mobile communication system, the connection between the mobile terminal and the host computer is established. In other words, the connection cannot be established without completing all the necessary check processes in the mobile communication system.

In the conventional authentication methods using secret-key encryption, a plurality of data exchanges are needed for connection establishment between a mobile terminal and a connection control station. Therefore, it is very difficult to shorten the time required for connection establishment.

SUMMARY OF THE INVENTION

An object of the present invention is to provide a method and system which can effectively perform connection establishment at a short time.

Another object of the present invention is to provide a method which can achieve rapid connection establishment with data security.

According to the present invention, when establishing a connection between a wireless mobile terminal and a host computer in a wireless mobile communications system, the wireless mobile terminal produces a connection establishment request signal including first information which is required to obtain services from the host computer and then transmits the connection establishment request signal to the host computer. When receiving the connection establishment request signal from the wireless mobile terminal, the host computer verifies the first information included in the connection establishment request signal received, and transmits a response signal back to the wireless mobile terminal only when the first information has been verified. This causes the connection to be established between the wireless mobile terminal and the host computer.

The wireless mobile terminal may encrypt the first information into encrypted data according to a predetermined encryption scheme and produce the connection establishment request signal which includes the encrypted data in place of the first information. Similarly, the host computer may decrypt the encrypted data included in the connection establishment request signal received into the first information according to the predetermined encryption scheme and verify the first information.

The first information may be encrypted into different encrypted data each time the connection establishment request signal is transmitted.

DETAILED DESCRIPTION OF THE PREFERRED EMBODIMENT

Figure 1:
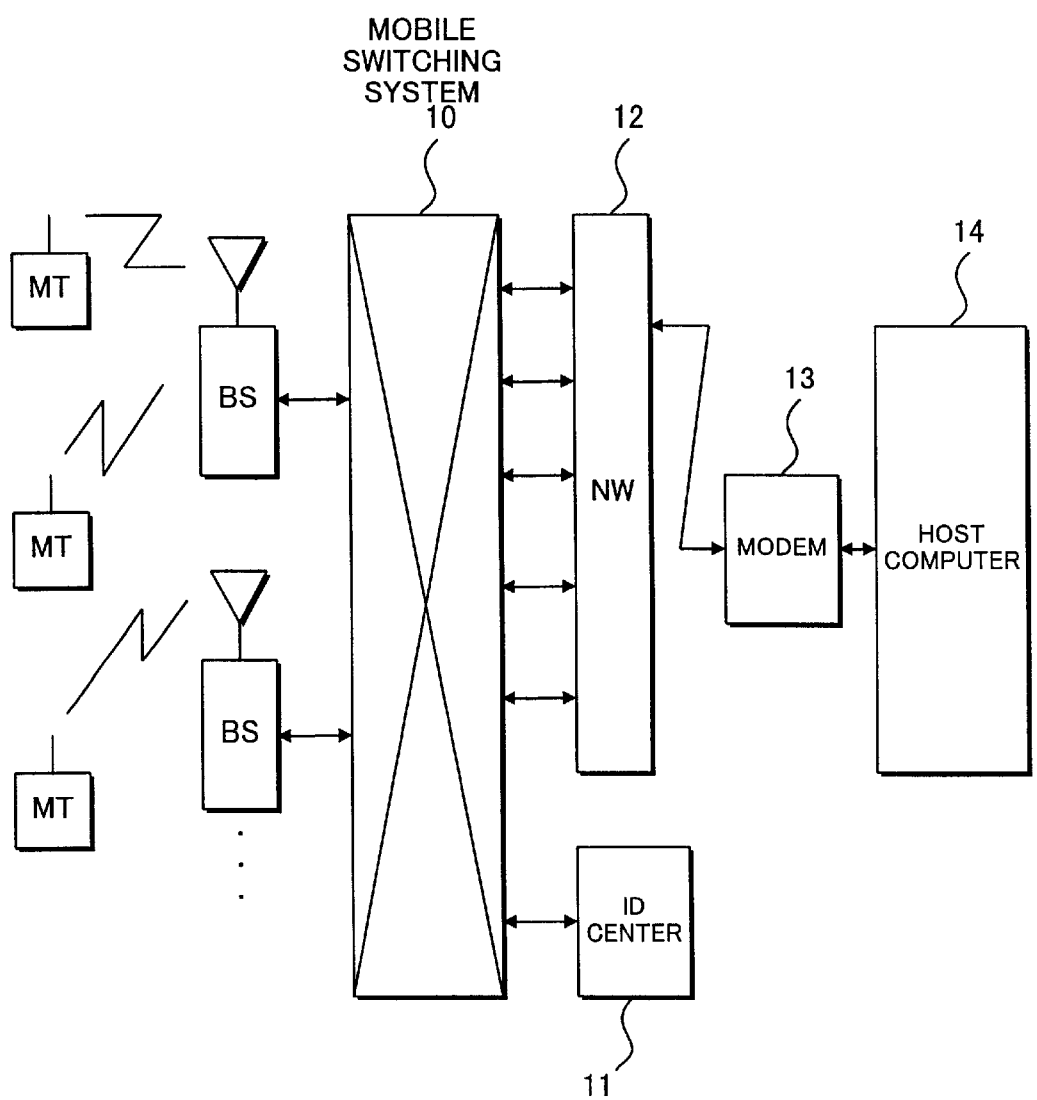
FIG. 1 is a schematic block diagram showing the configuration of a network system implementing on access method according to the present invention.

Referring to FIG. 1, a plurality of mobile terminals each labeled MT are possessed by registered subscribers, respectively. A plurality of base stations each labeled BS form radio zones, respectively. Each base station can communicate with each mobile terminal located therein through a radio channel. The base stations are connected to a mobile switching system 10 which is further connected to an ID center 11 and a stationary switched network 12 such as public switched telephone network.

A host computer 14 is connected to the stationary switched network 12 through a modem 13 or a set of digital service unit (DSU) and a terminal adapter (TA). Assuming that a mobile terminal MT is registered as a subscriber to the host computer 14, the mobile terminal MT can access to the host computer 14 through the mobile switching system 10 and the stationary switched network 12 according to an access procedure as will be described later.

Figure 2:
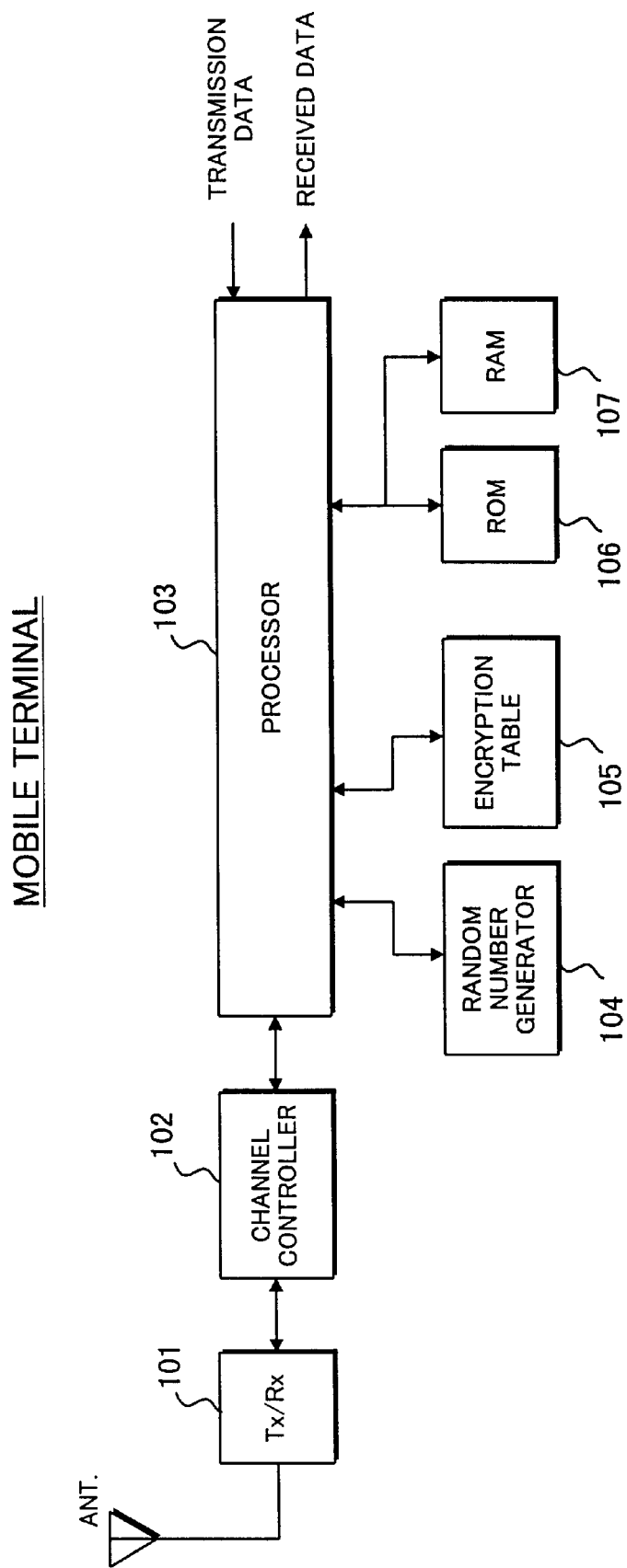
FIG. 2 is a block diagram showing the schematic internal circuit of a mobile terminal in the network system of FIG. 1.

Referring to FIG. 2, each mobile terminal MT is provided with a radio system 101 which receives and transmits a radio signal from and to a nearby base station through an antenna. The mobile terminal MT is further provided with a processor 103 performs the operation control of the mobile terminal. The processor 103 performs encryption/decryption processing using a random number generator 104 and an encryption table 105 to encrypt a predetermined part of transmission data and to decrypt received data. The operation control of the mobile terminal is performed using a ROM 106 and a RAM 107. The ROM 106 stored necessary programs and the subscriber ID number which was uniquely assigned to the mobile terminal MT. In the case of a mobile telephone, a speaker, a microphone, a display, and a keypad are further provided as a user interface.

Figure 3:
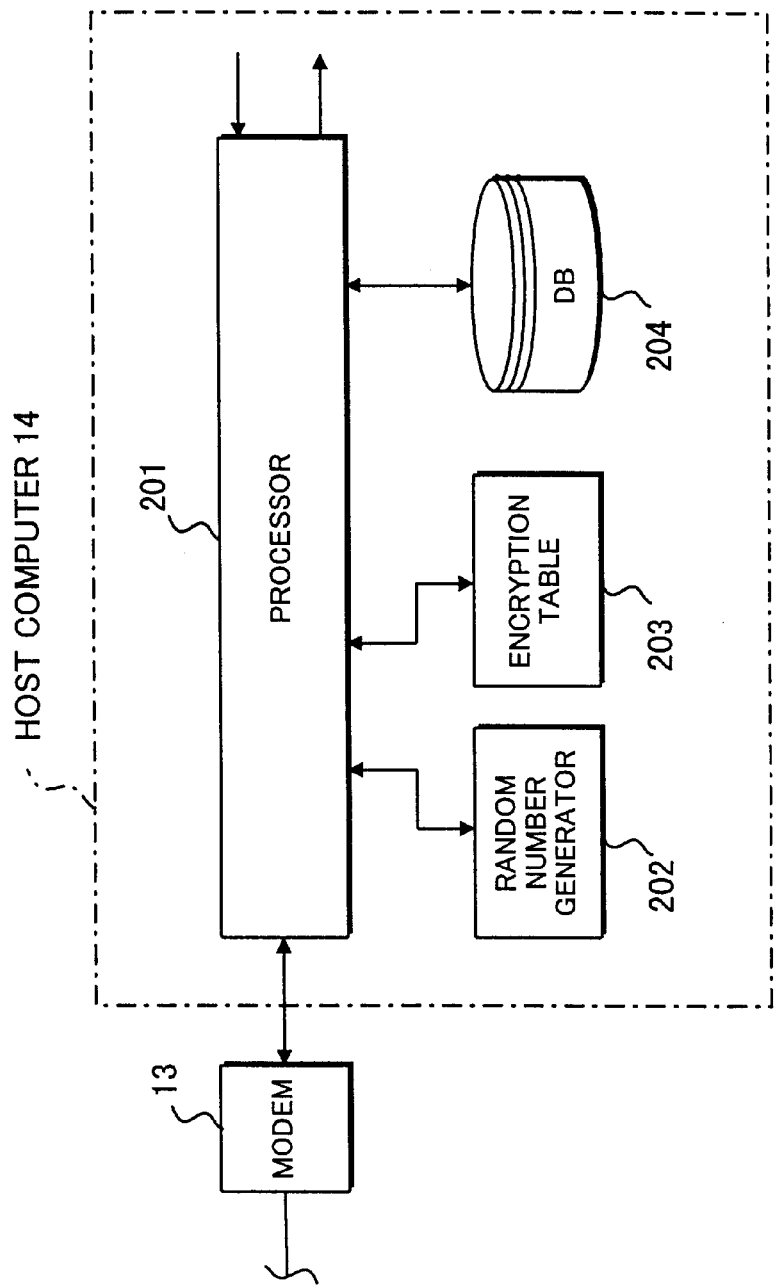
FIG. 3 is a block diagram showing the schematic internal circuit of a host computer in the network system of FIG. 1.

Referring to FIG. 3, the host computer 14 is provided with a processor 201 which performs encryption/decryption processing using a random number generator 202 and an encryption table 203 to decrypt a predetermined part of received data from the mobile terminal MT and to encrypt transmission data. The random number generator 102 and the encryption table 203 are the same as those of the mobile terminal MT. The processor 201 performs the operation control of the authentication procedure using a database 204 which stores terminal data, subscriber data and other necessary data for authentication and connection establishment.

ACCESS SEQUENCE

Figure 4:
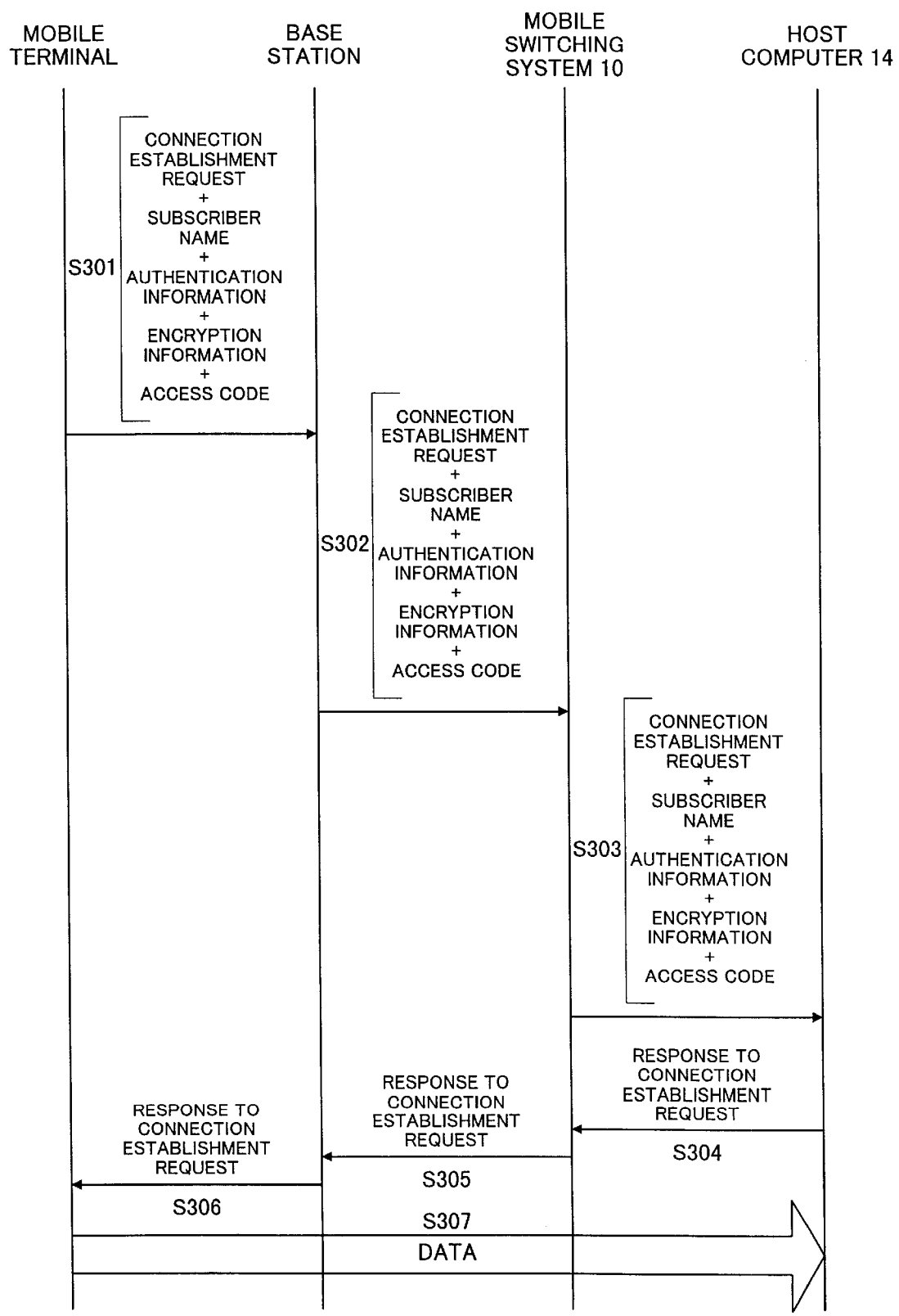
FIG. 4 is a diagram showing a sequence for connection establishment at according to an embodiment of the present invention.
Figure 5:
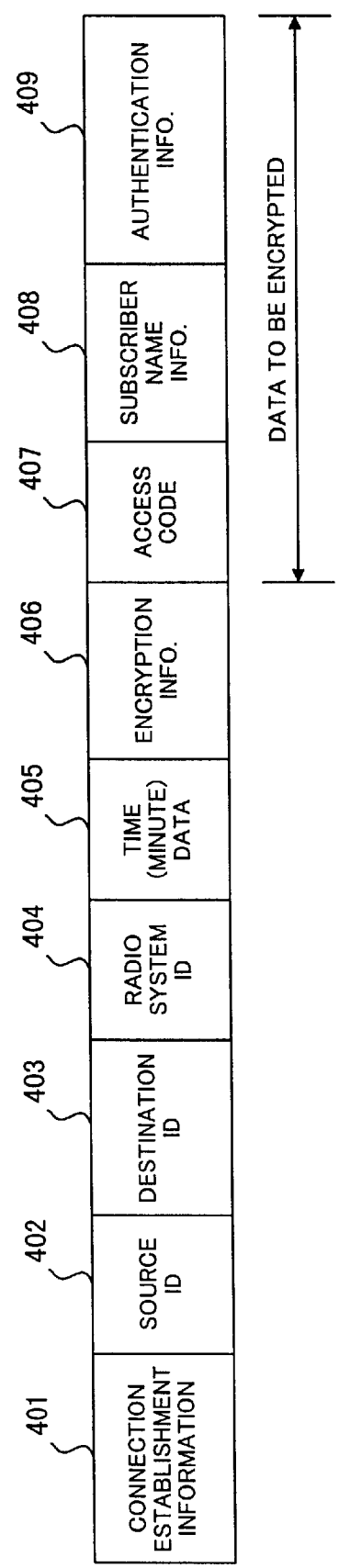
FIG. 5 is a diagram showing the signal format of a calling signal from a mobile terminal according to the embodiment.

Referring to FIG. 4, in the case where the mobile terminal MT is located in the radio zone of the nearby base station BS and requests connection establishment to the host computer 14, the processor 103 of the mobile terminal MT produces a connection establishment request signal conveying necessary information for communication with the host computer 14 as shown in FIG. 5. The necessary information includes subscriber name information, authentication information, encryption information and an access code as will be described in detail. A predetermined part of the connection establishment request signal is encrypted by the processor 103 using the random number generator 104 and the encryption table 105 and then the connection establishment request signal conveying encrypted data is transmitted to the nearby base station BS through a predetermined radio channel (step S301).

When receiving the connection establishment request signal from the mobile terminal MT, the base station BS transfers it to the mobile switching system 10 (step S302). If it is determined that the mobile terminal MT is a subscriber of the mobile communications system by the ID center 11 checking the ID number conveyed by the connection establishment request signal, the connection establishment request signal is transmitted to the stationary switched network 12. According to the destination ID number included in the connection establishment request signal, the stationary switched network 12 transfers it to the host computer 14 (step S303).

When receiving the connection establishment request signal including the encrypted data from the mobile terminal MT through the stationary switched network 12, the processor 201 of the host computer 14 decrypts the encrypted data and transfers the decrypted data to the processor 201. The processor 201 verifies the subscriber name information and the authentication information by referring to the database 204.

Only when the subscriber name information and the authentication information have been verified, the processor 201 produces a response to the connection establishment request and transmits it to the mobile switching system 10 through the stationary switched network 12 (step S304). The response is transferred from the mobile switching system 10 to the base station BS (step S305) and is further transferred from the base station BS to the mobile terminal MT through a radio channel (step S306).

In this manner, the connection between the mobile terminal MT and the host computer 14 is established and the mobile terminal MT can transmit data to the host computer 14 through the establishment connection (step S307). Since the necessary information is transmitted to the host computer 14 and the response to the connection establishment request is transmitted back to the mobile terminal MT when the necessary information has been verified, the connection can be established by only one data transmission-reception between the mobile terminal MT and the host computer 14. Therefore, the connection establishment is effectively performed at a short time. Further, only one data transmission-reception causes the reduced possibility that the connection fails to be established due to radio channel impairment conditions.

CONNECTION ESTABLISHMENT REQUEST SIGNAL

Referring to FIG. 5, the connection establishment request signal conveys the following information: connection establishment information 401, source ID number 402, destination ID number 403, radio system ID number 404, time data 405, encryption information 406, access code 407, subscriber name information 408 and authentication information 409. The source ID number 402 is the identification number of the mobile terminal MT and the destination ID number is the subscriber number of the host computer 14.

The time data 405 indicates the time of day when the mobile terminal MT makes a call. In this embodiment, the time data 405 indicates the minute of the time of day. The access code 407 is used to identify the access means and the type of the mobile terminal MT. More specifically, according to the access code 407 conveyed by the connection establishment request signal, the host computer 14 changes the connection establishment process to the procedure corresponding to the mobile terminal MT. The subscriber name information 408 is the ID number of the subscriber which possesses the mobile terminal MT.

To protect against tapping, a set of the access code 407, the subscriber name information 408 and the authentication information 409 (called ASA data, hereinafter) is encrypted and transmitted as will be described hereinafter.

ENCRYPTION

Figure 6:
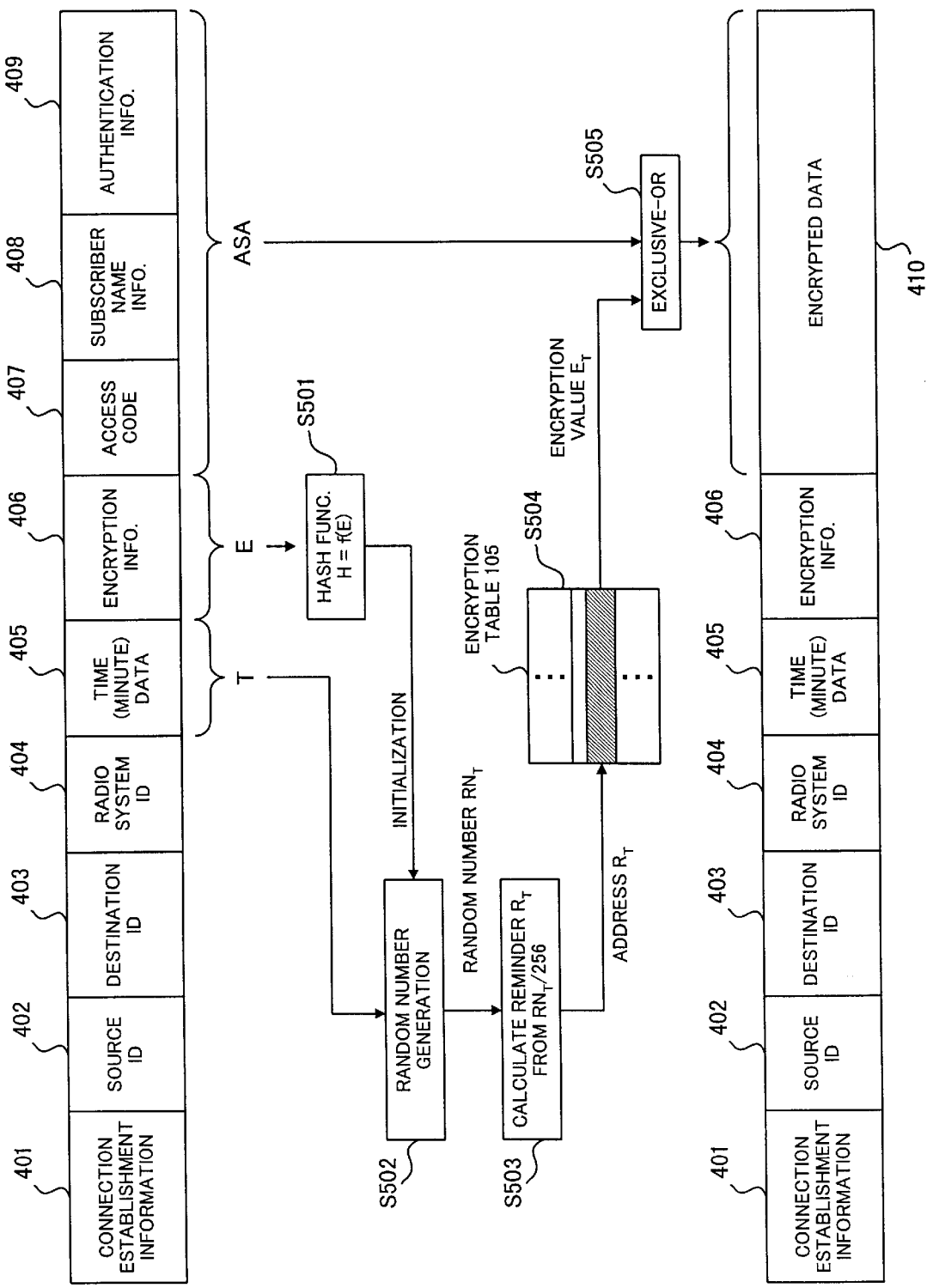
FIG. 6 is a diagram showing an operation of encryption process according to the embodiment.

As shown in FIG. 6, the processor 103 of the mobile terminal MT reads the encryption information 406 (here, value E) and the time (minute) data 405 (here, value T) from the connection establishment request signal. The processor 103 calculates a Hash value H from the value E using the Hash function: H=f(E) (step S501).

The processor 103 initializes the random number generator 104 according to the Hash value H and then obtains a random number $RN_T$ from the random number generator 104 according to the value T of the time (minute) data 405 (step S502). Further, the processor 103 converts the random number $RN_T$ to a number $R_T$ ranging from 0 to 255 by dividing the random number $RN_T$ by 256 to obtain the remainder $R_T$ thereof (step S503).

Subsequently, the processor 103 reads encryption value $E_T$ from the location of the encryption table 105 which is addressed with the remainder $R_T$. Finally, the processor 103 exclusive-ORs the encryption value $E_T$ and the ASA data of the access code 407, the subscriber name information 408 and the authentication information 409 to produce encrypted data 410 (S505). In this manner, the processor 103 produces the connection establishment request signal including the encrypted data 410 which is to be transmitted to the host computer 14.

DECRYPTION

Figure 7:
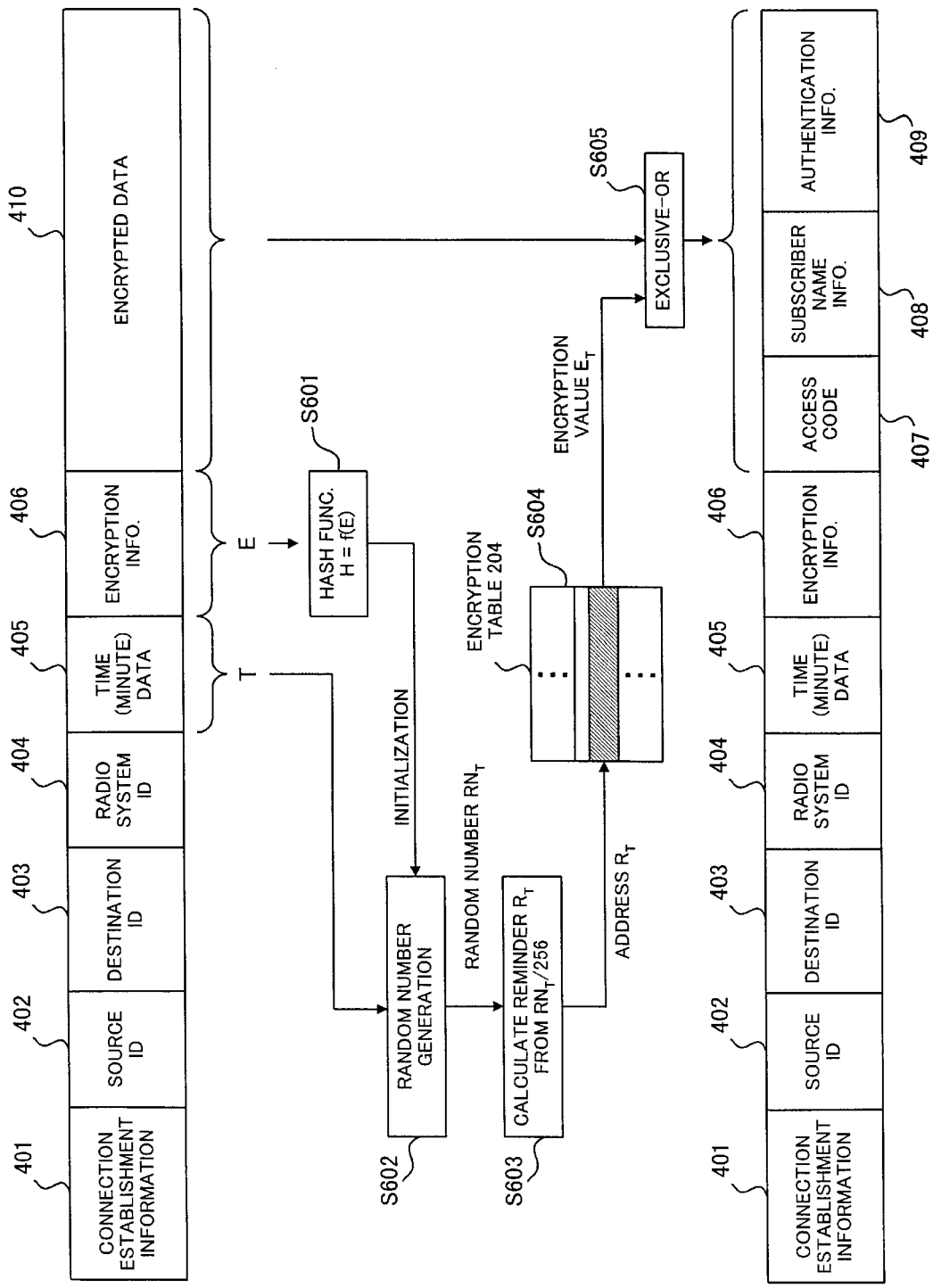
FIG. 7 is a diagram showing an operation of decryption process according to the embodiment of the present invention.

As shown in FIG. 7, when receiving the connection establishment request signal including the encrypted data 410 from the mobile terminal MT, the processor 201 of the host computer 14 reads the encryption information 406 (here, value E) and the time (minute) data 405 (here, value T) from the received connection establishment request signal. The processor 201 calculates a Hash value H from the value E using the Hash function: H=f(E) (step S601).

The processor 201 initializes the random number generator 202 according to the Hash value H and then obtains a random number $RN_T$ from the random number generator 202 according to the value T of the time (minute) data 405 (step S602). Further, the processor 201 converts the random number $RN_T$ to a number $R_T$ ranging from 0 to 255 by dividing the random number $RN_T$ by 256 to obtain the remainder $R_T$ thereof (step S603).

Subsequently, the processor 201 reads encryption value $E_T$ from the location of the encryption table 203 which is addressed with the remainder $R_T$. Finally, the processor 201 exclusive-ORs the encryption value $E_T$ and the encrypted data to reproduce the original set of the access code 407, the subscriber name information 408 and the authentication information 409. In this manner, the processor 201 produces the original connection establishment request signal.

Since the data to be secret is encrypted and then transmitted from the mobile terminal MT to the host computer 14, the data security is maintained.

What is claimed is:

1. An encryption method for encrypting a part of a transmission signal in a wireless mobile communications system, comprising the steps of:

a) producing a transmission signal including first information to be encrypted, encryption information, and time information which indicates when the transmission signal is transmitted;

b) generating a random number based on the encryption information and the time information;

c) converting the random number to an encryption address value having a predetermined number of digits;

d) reading an encryption value from an encryption table depending on the encryption address value; and e) encrypting the first information by combining the encryption value and the first information.

2. The encryption method according to claim 1, wherein the step b) comprises the steps of:

generating a Hash value from the encryption information using Hash function;

initializing a random number generator depending on the Hash value; and generating the random number from the time information.

3. The decryption method according to claim 1, wherein in the step e), the first information is encrypted by Exclusive-ORing the encryption value and the first information.

4. An decryption method for encrypting a part of a reception signal in a wireless mobile communications system, comprising the steps of:

a) receiving a reception signal including encrypted data to be decrypted, encryption information, and time information which indicates when the reception signal is transmitted at a transmitting data;

b) generating a random number based on the encryption information and the time information;

c) converting the random number to an encryption address value having a predetermined number of digits;

d) reading an encryption value from an encryption table depending on the encryption address value; and e) decrypting the encrypted data by combining the encryption value and the encrypted data.

5. The decryption method according to claim 4, wherein the step b) comprises the steps of:

generating a Hash value from the encryption information using Hash function;

initializing a random number generator depending on the Hash value; and generating the random number from the time information.

6. The decryption method according to claim 4, wherein in the step e), the encrypted data is decrypted by Exclusive-ORing the encryption value and the encrypted data.

* * * * *